United States Patent Office 2,955,128
Patented Oct. 4, 1960

2,955,128
CHLOROSULFONYLALKYL SILICON COMPOUNDS

Donald L. Bailey, Snyder, N.Y., assignor to Union Carbide Corporation, a corporation of New York No Drawing. Filed Dec. 31, 1958, Ser. No. 784,034

13 Claims. (Cl. 260—448.2)

This invention relates to organo-functional organosilicon compounds and to a process for their production. More particularly, this invention relates to organosilicon compounds containing a chlorosulfonyl radical $$(-SO_2Cl)$$

interconnected to silicon through an aralkyl group in which the aryl portion contains up to and including 10 carbon atoms and to a process for producing the same.

Silicon compounds containing a phenyl group directly attached to the silicon atom can not be sulfonated or chlorosulfonated to yield sulfophenylsilicon or chlorosulfonylphenylsilicon derivatives since the phenyl to silicon bond is ruptured under the conditions employed in the sulfonation or chlorosulfonation. Silicon compounds containing a benzyl group attached to the silicon atom have been sulfonated and chlorosulfonated; however, these silicon compounds were either silanes having no silicon functionality or disiloxanes wherein the silicon atom is monofunctional. Furthermore, such sulfonated benzylsilicon compounds are unstable under alkaline conditions, the benzylsilicon bond undergoing cleavage.

I have discovered that aralkylsilicon compounds containing 2 or 3 silicon-halogen bonds can be readily chlorosulfonated. This is unexpected since it was previously believed by skilled workers in the art that in the chlorosulfonation of methylsilanes, those methylsilanes containing two or three chlorine atoms attached to silicon will not undergo chlorosulfonation. It has been found that aralkylsilicon compounds can be chlorosulfonated to yield chlorosulfonylaralkylsilicon compounds.

The novel organo-functional organosilicon compounds of this invention are organosilicon compounds containing a silicon-bonded chlorosulfonylaralkyl group of the formula:

$$ClO_2S\overset{Z}{-}\overset{|}{R}-(C_aH_{2a})- \qquad (I)$$

where R is a trivalent aryl group containing up to and including 10 carbon atoms, $a$ is an integer of 1 through 4, Z is a member of the class consisting of hydrogen, alkyl, aryl and groups of the formula:

$$-C_aH_{2a}-Si\equiv$$

and $$\underset{H_4}{\diagdown}-(C_aH_{2a})-Si\equiv$$

in which said group is connected to R through carbon to carbon linkage, said organosilicon compound being selected from the class consisting of chlorosulfonylaralkylhalosilanes of the formula:

$$ClO_2S\overset{Z'}{-}\overset{|}{R}-C_aH_{2a}\overset{R'_n}{-}\overset{|}{Si}X_{3-n} \qquad (II)$$

where R and $a$ have the above-defined meanings, R' is an alkyl group, X is halogen, preferably fluorine, chlorine or bromine, $n$ is an integer of from 0 through 1, Z' is a member of the class consisting of hydrogen, alkyl, aryl and groups of the formula:

$$-C_aH_{2a}\overset{R'_n}{\underset{|}{Si}}X_{3-n}$$

and $$\underset{H_4}{\diagdown}-C_aH_{2a}\overset{R'_n}{\underset{|}{Si}}X_{3-n}$$

in which said group is connected to R through carbon to carbon linkage, wherein R', X, $a$ and $n$ have the above-defined means, and (2) chlorosulfonylaralkylsiloxanes of the formula:

$$ClO_2S\overset{Z''}{-}\overset{|}{R}-C_aH_{2a}\overset{R'_n}{-}\overset{|}{Si}O_{\frac{3-n}{2}} \qquad (III)$$

wherein Z'' is a member of the class consisting of hydrogen, alkyl, aryl and groups of the formulas:

$$-C_aH_{2a}\overset{R'_n}{\underset{|}{Si}}O_{\frac{3-n}{2}}$$

and $$\underset{H_4}{\diagdown}-C_aH_{2a}\overset{R'_n}{\underset{|}{Si}}O_{\frac{3-n}{2}}$$

in which said group is connected to R through carbon to carbon linkage, wherein R', $a$ and $n$ have the above-defined meanings and (3) chlorosulfonylaralkylsiloxanes consisting of at least one unit as defined in (2) and at least one unit of the formula:

$$R''_bSiO_{\frac{4-b}{2}} \qquad (IV)$$

where R'' is a monovalent hydrocarbon radical and $b$ is an integer of from 0 through 3. The organosilicon compounds of this invention are hereinafter referred to as chlorosulfonylaralkylsilicon compounds. By the term "chlorosulfonyl" as used herein is meant a radical having the formula $ClO_2C-$. By the term "sulfo" as used herein is meant a radical having the formula $HO_3S-$. Illustrative of the aryl groups that R may represent are: phenyl, tolyl, xylyl, butylphenyl, ethylphenyl, naphthyl and the like. Illustrative of the alkyl groups that R' may represent are: methyl, ethyl, propyl, butyl, and the like. Illustrative of the monovalent hydrocarbon radicals that R'' may represent are: alkyl groups such as methyl, ethyl, butyl, and the like; alkenyl groups such as, vinyl, allyl, butenyl and the like; cycloalkyl groups such as, cyclopentyl, cyclohexyl and the like; aryl groups such as phenyl, tolyl, xylyl, naphthyl and the like; and aralkyl groups such as, benzyl, phenylethyl and the like.

The chlorosulfonylaralkylsilicon compounds of this invention includes the chlorosulfonylaralkylhalosilanes as represented by Formula II. Illustrative of the chlorosulfonylaralkylhalosilanes which are included in Formula II are: alpha - (chlorosulfonylphenyl)ethyltrichlorosilane, beta - (chlorosulfonylphenyl)ethyltrichlorosilane, beta-(chlorosulfonylphenyl)ethylmethyldichlorosilane, beta-(chlorosulfonylphenyl)ethylmethyldifluorosilane, bis-(trichlorosilylethyl)-chlorosulfonyl benzene, beta - (chlorosulfonylnaphthyl)ethyltrichlorosilane, beta - (chlorosulfonylbiphenyl)ethyltrichlorosilane, beta - (chlorosulfonylphenyl)propyltrichlorosilane, beta - (chlorosulfonylphenyl)ethyldimethylfluorosilane, gamma - (chlorosulfonylphenyl)propyltrichlorosilane and the like.

The chlorosulfonylaralkylsilicon compounds of this invention also include those chlorosulfonylaralkylsiloxanes of Formula III. Included in Formula III are chlorosulfonylaralkysiloxanes which are trifunctional with respect to the silicon, i.e., where $n=0$, chlorosulfonylaralkylsiloxanes which are difunctional with respect to silicon, i.e., where $n=1$, and chlorosulfonylaralkysiloxanes which contain both difunctional and trifunctional silicon atoms. Illustrative of such trifunctional chlorosulfonylaralkylsiloxanes are beta-(chlorosulfonylphenyl)- ethylpolysiloxane $(ClO_2S—C_6H_4(CH_2)_2SiO_{3/2})$, beta-(chlorosulfonylnaphthyl)ethylpolysiloxane $$(ClO_2S—C_{10}H_6(CH_2)_2SiO_{3/2})$$

beta-(chlorosulfonylbiphenyl)ethylpolysiloxane $$(ClO_2S—C_{12}H_8(CH_2)_2SiO_{3/2})$$

gamma-(chlorosulfonylphenyl)propylpolysiloxane $$(ClO_2S—C_6H_4—(CH_2)_3—SiO_{3/2})$$

and the like. The chlorosulfonylaralkylsiloxanes which are difunctional with respect to the silicon atom exist as linear and/or cyclic chlorosulfonylaralkylsiloxanes, having units of the formula:

$$\left[ \begin{array}{cc} Z''' & R' \\ | & | \\ ClO_2S—R—(C_aH_{2a})SiO \end{array} \right] \quad (V)$$

where $Z'''$ is a member of the class consisting of hydrogen, alkyl, aryl and groups of the formula:

and

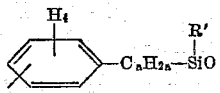

and said group is connected to R through carbon to carbon linkage and R, R', and $a$ have the above-defined meanings. The linear chlorosulfonylaralkylsiloxanes contain a number of such units of Formula V, whereas the cyclic chlorosulfonylaralkylsiloxane contains from 3 to 7 such units. Illustrative of such linear chlorosulfonylaralkylsiloxanes are beta-(chlorosulfonylphenyl)ethylmethylsiloxane $[ClO_2S—C_6H_4(CH_2)_2Si(CH_3)O]$, beta-(chlorosulfonylphenyl)ethylpropylsiloxane $$[ClO_2S—C_6H_4(CH_2)_2Si(C_3H_7)O]$$

gamma-(chlorosulfonylphenyl)propylmethylsiloxane $$[ClO_2S—C_6H_4(CH_2)_3Si(CH_3)O]$$

and the like.

The polymeric siloxanes of this invention also include those siloxanes containing at least one chlorosulfonylaralkylsiloxane unit of Formula III combined with one or more siloxane units having the general formula:

$$R''_b—SiO_{\frac{4-b}{2}} \quad (IV)$$

wherein $R''$ is as above-defined and need not be the same throughout the molecule, and $b$ is an integer of from 0 through 3 and $b$ need not have the same value throughout the molecule, but has the same value in the same unit. These polymeric siloxanes include those containing at least one unit of Formula III with any and all combinations of the units depicted by Formula IV. These polymeric siloxanes also include those siloxanes which consist of a combination of such units having the structure depicted by Formula IV wherein the silicon atom in Formula IV can be mono-, di- and trifunctional and units having the Formula III wherein the silicon atom can be di- and/or trifunctional. Thus, for example, the polymeric siloxanes of the present invention include polymeric siloxane containing difunctional units of Formula III with di- and monofunctional units of Formula IV; polymeric siloxane containing trifunctional units of Formula III with mono- and difunctional units of Formula IV; polymeric siloxanes containing di- and trifunctional units of Formula III with mono-, di- and trifunctional units of Formula IV and the like.

The chlorosulfonylaralkylhalosilanes of this invention are produced by the process which comprises reacting an aralkylhalosilane with chlorosulfonic acid in a solvent while maintaining the mixture at a proper temperature. The reaction proceeds according to the following equation which shows the reaction of beta-phenylethyltrichlorosilane and chlorosulfonic acid for purposes of illustration:

$$2ClSO_3H + C_6H_5C_2H_4SiCl_3 \rightarrow$$
$$ClO_2SC_6H_4—C_2H_4SiCl_3 + HCl + H_2SO_4$$

According to the above equation, it can be seen that at least two moles of chlorosulfonic acid per mole of the aralkylhalosilane are required to obtain complete reaction. However, it is preferred to employ a 3 to 1 mole ratio of chlorosulfonic acid to aralkylhalosilane in order to obtain the best results. Higher ratios of chlorosulfonic acid to aralkylhalosilane can be used, but no commensurate advantage is obtained thereby.

The addition of the aralkyl halosilane to the chloroform solution of chlorosulfonic acid is important in preventing undesirable side reactions. If chlorosulfonic acid is added to the aralkyl halosilane, appreciable amounts of a sulfone derivative are formed because of the excess of the aralkylhalosilane present.

Temperatures of from about $-30°$ C. to $60°$ C. and even higher can be employed in the process of this invention. It is preferred that the temperature of the reaction be maintained below $20°$ C. in order to prevent undesirable side reactions such as the formation of sulfones and cleavage of silicon-halide bonds which reduce the yield of the chlorosulfonylaralkylchlorosilanes. In conducting the process of this invention, we prefer to employ temperatures of from $-25°$ C. to $20°$ C.

A solvent is essential in the production of the chlorosulfonylaralkylhalosilanes according to the above described process. In the absence of a solvent, cleavage of the siliconhalogen bonds occurs and a distillable product is not obtained. Any liquid organic solvent can be used if it is substantially inert to chlorosulfonic and sulfuric acids and preferably is incompatible with the sulfonic acid formed as a by-product of the chlorosulfonation reaction. Such solvents are, for example, the highly chlorinated derivatives of aliphatic hydrocarbon methane and ethane and mixtures of such derivatives. Such derivatives are, for example, chloroform, carbontetrachloride, tetrachloroethylene, hexachloroethane, pentachloroethane and the like. Particularly preferred as a solvent is chloroform, since it is inert to chlorosulfonic and sulfuric acid, it dissolves chlorosulfonic acid, but is incompatible with sulfuric acid. The amount of solvent employed in the process of this invention is not narrowly critical and can be from 25 to 90% by weight of the total weight of the reaction mixture, i.e., the weight of the aralkylhalosilane plus the weight of the chlorosulfonic acid plus the weight of the solvent. We prefer to use from 40 to 80% by weight of solvent based on the total weight of the reaction mixture.

The process of this invention can be conducted at atmospheric, superatmospheric or subatmospheric pressures. It is preferred to conduct the process of this invention at atmospheric pressure, whereby one can utilize simple and inexpensive apparatus.

The chlorosulfonylaralkylsiloxanes of this invention are produced by the hydrolysis and condensation of the corresponding chlorosulfonylaralkylhalosilane or by the cohydrolysis and co-condensation of the corresponding chlorosulfonylaralkylhalosilane with hydrolyzable silanes, having the formula:

$$R''_b SiY_{4-b}$$

where R'' and b have the above-defined values and Y is a hydrolyzable group such as alkoxy, halogen or acetoxy, according to the following general procedure:

The chlorosulfonylaralkylhalosilanes described above are readily hydrolyzed to the corresponding siloxane by treatment with water at 0 to 20° C. or by pouring onto crushed ice. In most cases hydrolysis is complete in less than 30 minutes. Temperatures above room temperature are undesirable because under these conditions the chlorosulfonylaralkylsilicon compound is hydrolyzed to the corresponding sulfonic acid. Solvents such as diethylether and benzene can be used in carrying out the hydrolysis but are unnecessary. It is convenient to use a large excess of water to obtain complete hydrolysis of the silicon-halogen bonds without attacking the sulfonyl chloride group. The cohydrolysis and co-condensation is carried out by pouring a mixture of the chlorosulfonylaralkylhalosilane and hydrolyzable silane into water at 0 to 20° C.

The starting materials for the preparation of the chlorosulfonylaralkylhalosilanes of this invention are the aralkylhalosilanes of the formula:

$$Z'-A-C_aH_{2a}SiX_{3-n}R'_n$$

wherein R', X, Z', a and n are as above-defined and A is a divalent aryl group containing up to and including 10 carbon atoms. Illustrative of the aralkyl silanes included in the above formula are: alpha-phenylethyltrichlorosilane, beta-phenylethyltrichlorosilane, beta-phenylethylmethyldichlorasilane, beta - phenylethylmethyldifluorosilane, bis(trichlorosilylethyl)benzene, beta-naphthylethyltrichlorosilane, beta-biphenylethyltrichlorosilane, beta-phenylpropyltrichlorosilane, beta - phenylethyltrifluorosilane, gamma-phenylpropyltrichlorosilane and the like.

The chlorosulfonylaralkylhalosilanes and siloxanes are intermediates for the preparation of sulfuric acid-free sulfoaralkylsiloxanes and the salts of said sulfoaralkylsiloxanes. The sulfoaralkylsiloxanes are useful as catalysts for polymerization of isobutylene. The salts of the sulfoaralkylpolysiloxanes are useful as anti-fog agents on mirrors and automobile windshields.

The sulfoaralkylpolysiloxanes are prepared by the hydrolysis of the chlorosulfonylaralkylhalosilanes with water. The hydrolysis is conducted by forming a mixture of the chlorosulfonylaralkylhalosilane to an amount of water in excess of that required to hydrolyze the halogen atoms bonded to silicon and the chlorine atom of the chlorosulfonyl group and heating the mixture to a temperature of about 80° C. to 100° C. The sulfoaralkylpolysiloxane is recovered by the evaporation of the water and hydrochloric acid from the hydrolysis mixture.

By employing a chlorosulfonylaralkylhalosilane in the hydrolysis no sulfuric acid will be present to contaminate the sulfoaralkylpolysiloxane thus produced. The salts of the sulfoaralkylsiloxanes are prepared by treating the sulfoaralkylpolysiloxane with a base such as sodium hydroxide, potassium hydroxide, ammonium hydroxide, and the like.

The following examples serve to further illustrate this invention and are not to be construed as limitations thereon.

Example 1

In a 3-liter flask equipped with a mechanical stirrer, gas inlet tube, dropping funnel, thermometer, and vent tube, was placed 351 g., 3 moles of chlorosulfonic acid (technical grade) dissolved in 700 ml. of anhydrous chloroform. The vessel was immersed in an ice bath and cooled to 6° C. An atmosphere of dry nitrogen gas was maintained above the solution at all times. Through the dropping funnel was added, with stirring, a solution of beta-phenylethyltrichlorosilane (230 g., 1 mole) in 240 ml. of anhydrous chloroform, over a 1-hour period. The temperature was kept at 6–10° C. by means of the ice bath, and hydrogen chloride was evolved continuously. After addition, stirring was stopped and the reaction mixture was allowed to stand for 30 minutes before being transferred to a separatory funnel. Anhydrous carbon tetrachloride (310 ml.) was added, and the mixture shaken vigorously. The lower sulfuric acid layer which separated out after 1 hour of standing was removed and discarded. The chloroform-carbon tetrachloride layer was placed in a vented flask over 100 g. of anhydrous calcium chloride for 15 hours to remove traces of sulfuric acid. The vent was attached to a drying tube filled with anhydrous calcium sulfate to exclude moisture. After filtering off the calcium chloride, the solution was stripped under reduced pressure at 25–30° C. (warm water bath) to remove the solvents. The resulting liquid residue (300 g.) was the product. Distillation at reduced pressure gave 199 g. (59 mole-percent) of beta(chlorosulfonylphenylethyltrichlorosilane, B.P. 148–154° C. (0.8–1.5 mm), which upon prolonged standing crystallized to a solid melting at 40–45° C. Elemental analysis gave the following results: Calculated for $C_8H_8SiO_2Cl_4S$: 9.7% S; 42.0% Cl; neut. equiv. 67.6. Found 9.7% S; 43.3% Cl; neut. equiv. 68.2.

Example 2

In a 1-liter, 3-necked flask equipped with a magnetic stirrer, gas inlet tube, dropping funnel, thermometer and escape-gas vent tube was placed 176.0 g. (1.5 moles) of technical grade chlorosulfonic acid dissolved in 350 g. of anhydrous chloroform solvent. The vessel was immersed in a Dry Ice-acetone bath and cooled to —20° C. An atmosphere of dry argon gas was maintained in ths flask at all times. Through the dropping funnel was added (with stirring) a solution of 109.6 g. (0.5 mole) of alpha-phenylethylmethyldichlorosilane in 100 g. anhydrous chloroform over a 2-hour period. The temperature was maintained at —15 to —20° C. by the Dry Ice-acetone bath. Anhydrous carbon tetrachloride (250 g.) was then added, and the reaction mixture kept at —22° C. for 20 hours. The solution was allowed to come to room temperature during which time sulfuric acid began to separate out. The sulfuric acid was drained off and the upper clear carbon tetrachloride chloroform layer was removed and 35 g. of anhydrous ammonium chloride added and allowed to stand for 15 hours. The solids were then removed by filtration, and the filtrate evaporated at reduced pressure. The residue was then distilled through a short insulated still head to yield 100 g. (63 percent yield) of alpha(chlorosulfonylphenyl)ethylmethyldichlorosilane having a B.P. 145–155° C., at 0.2 to 0.25 mm., and a M.P. 50–54° C. Elemental analysis gave the following results: Calculated for $C_9H_{11}SiO_2Cl_3S$: 8.84% Si; 10.1% S; 33.5% Cl. Found: 8.9% Si; 10.2% S; 32.6% Cl.

Hydrolysis of the alpha-(chlorosulfonylphenyl)ethylmethyldichlorosilane in ice water gave the water insoluble alpha-chlorosulfonylphenylethylmethylsiloxane.

The alpha - (chlorosulfonylphenyl)ethylmethylsiloxane was then heated with 12 molar sodium hydroxide on a steam bath for 20 hours. The solution was then acidified with hydrochloric acid and allowed to stand. A white solid material began to precipitate. No silicon containing material was found in the acid solution after filtration. The white solid material was filtered off and dried and then submitted for an Si, S analysis and also an infrared survey. The infrared survey indicated that the white solid material was essentially methyl polysiloxane. The original Si to S ratio of the alpha-(chlorosulfonylphenyl)ethylmethylsiloxane was one to one while in the sodium hydroxide treated white solid material, the ratio was 1 sulfur atom to 27 silicon atoms. The infrared and elemental analyses of the white solid material after treatment with 12 molar base indicated that the alpha-sulfophenylethylmethylsiloxane is not stable in basic solutions.

Example 3

In a 1-liter, 3-necked flask equipped with a magnetic stirrer, gas inlet tube, dropping funnel, thermometer and escape-gas vent-tube were placed 176.0 g. (1.5 moles) of technical grade chlorosulfonic acid and 350 g. of anhydrous chloroform. The vessel was immersed in a Dry Ice-acetone bath and cooled to −20° C. An atmosphere of dry nitrogen gas was maintained in the flask at all times. Through the dropping funnel was added (with stirring) a solution of 109.6 g. (0.5 mole) of beta-phenylethylmethyldichlorosilane in 100 g. of anhydrous chloroform, over a 2-hour period. The temperature was maintained at −15° to −20° C. by the Dry Ice-acetone bath. Anhydrous carbon tetrachloride (250 g.) was added and the reaction mixture was kept at −25° C. for 17 hours. The clear solution was allowed to come to room temperature at which time sulfuric acid began to separate out. After 4 hours the clear upper chloroform-carbon tetrachloride layer was removed and placed over 20 g. of powdered anhydrous ammonium chloride for 15 hours. The solids were removed by filtration and the filtrate was evaporated at reduced pressures to give 118 g. (74 mole-percent) of a liquid product. Distillation through a short insulated still head gave 55 g. (41 mole-percent yield) of beta-(chlorosulfonylphenyl)ethylmethyldichlorosilane having a B.P. 168° (0.8 mm.) −170° C. (0.06 mm.), which gave the following elemental analysis. Found: Si 8.6% (theory 8.84%); S 12.0% (theory 10.1%).

Example 4

In a 250-ml., 3-necked flask equipped with a magnetic stirrer, dropping funnel, thermometer, gas inlet tube, and escape-gas vent-tube were placed 35.1 g. (0.3 mole) of technical grade chlorosulfonic acid and 70 g. of anhydrous chloroform solvent. The vessel was immersed in an ice bath and cooled to 4° C. An atmosphere of anhydrous argon gas was maintained in the flask at all times. Through the dropping funnel was added a solution of 18.8 g. (0.1 mole) of beta-phenylethylmethyldifluorosilane in 20 g. of anhydrous chloroform over a 0.5 hour period with stirring. The temperature remained at 4–5° C. during the addition. The reaction was kept at 4–5° C. for an additional 2 hours and the sulfuric acid which separated during this period was discarded. The chloroform layer was placed over anhydrous calcium chloride for 17 hours, filtered, and evaporated at reduced pressures to give 21.2 g. of beta-(chlorosulfonylphenyl)ethylmethyldifluorosilane. Distillation gave 14.2 g. (49.7 mole-percent yield) of a liquid product having a B.P. 131–135° C. (0.7 mm.), which had a neutralization equivalent of 75 and a chlorine content of 10.7% which agrees closely with the value calculated for beta-(chlorosulfonylphenyl)ethylmethyldifluorosilane, neut. equiv. 72 and chlorine content 12.3%.

Example 5

In a 500 cc. beaker filled with crushed ice and 50 cc. of water was added, with stirring, 82 g. of beta-(chlorosulfonylphenyl)ethyltrichlorosilane $$ClO_2SC_6H_4CH_2CH_2SiCl_3$$

over a period of 15 minutes. Stirring was continued for an additional one-half hour after the addition was complete. The white solid which formed was separated by filtration and air dried for 4 days to give 64 g. of $[ClO_2SC_4H_6CH_2CH_2SiO_{3/2}]_x$. 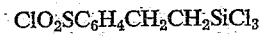 The formula of the compound was confirmed by chemical analysis which is as follows: Calculated: C, 37.6%; H, 3.14%; Si, 10.9% Cl, 13.9%; S, 12.55%. Found: C, 37.0%; H, 4.2%; Si, 10.2%; Cl, 13.9%; S, 11.7%.

Example 6

A solution of 16.4 grams of beta-(chlorosulfonylphenyl)ethylmethyldichlorosilane (prepared in Example 3), in 110 ml. of diethylether was added dropwise with stirring to a mixture of 40 ml. of diethylether in 200 grams of ice. The ether layer was separated and the aqueous residue washed three times with 50 ml. diethylether. The combined ether extracts were diluted with 200 ml. of toluene, and both solvents removed by stripping at 80° to 90° C. for 3 hours; 13 grams of beta(chlorosulfonylphenyl)ethylmethylpolysiloxane $$[ClO_2SC_6H_4CH_2CH_2Si(CH_3)O]_x$$

was obtained.

The 13 grams of the beta(chlorosulfonylphenyl)ethylmethylpolysiloxane were combined with 107 grams of cyclic dimethylsiloxane and 9.98 grams of dodecamethylpentasiloxane and the mixture equilibrated with sulfuric acid; an oily siloxane polymer (84 g.) was recovered. The oily siloxane polymer contained the expected percentage of sulfur and chlorine as calculated from the ratio of starting materials. This oily siloxane polymer had the formula $(CH_3)_3SiO[(CH_3)_2SiO]_{cir.\ 66}[ClO_2S$
$\quad —C_6H_4CH_2CH_2Si(CH_3)O]_{cir.\ 2}Si(CH_3)_3$

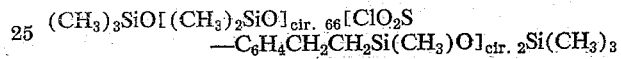

Example 7

A 302 g. (0.89 mole) sample of undistilled beta-chlorosulfonylphenylethyltrichlorosilane was prepared as in Example 1. This sample was added from a dropping funnel to 500 g. of crushed ice in a 2-liter beaker. The addition required 1.0 hours and the ice mixture was stirred continuously. The intermediate beta-(chlorosulfonylphenyl)ethylsiloxane was formed as a white water-insoluble granular solid. The solids were broken up with a spatula and the suspension was placed on a steam bath for 90 hours to hydrolyze the chlorosulfonyl groups and give the completely water soluble beta-sulfophenylethylsiloxane. The water solution was filtered and stripped to dryness at reduced pressure. The residue was dried for 50 hours at 60–80° C. The yield of solid resinous beta-sulfophenylethylsiloxane was 201 g. (85 mole-percent), and was contaminated with sulfuric acid. A 91 g. sample was dissolved in 400 ml. of distilled water and passed through a glass column (2 cm. diameter x 12 cm. long) packed with 40 g. of freshly washed Rohm and Haas' Amberlite IR–410 (OH) base-exchange resin. The effluent was stripped to dryness and dried for 26.5 hours at 90° C. at reduced pressure to give 82.7 g. of sulfuric acid-free beta (sulfophenyl)ethylpolysiloxane $$(HO_3S—C_6H_4CH_2CH_2SiO_{3/2})$$

which gave the following analysis: Calculated: Si, 11.9%; S, 13.5%; C, 40.6%; H, 3.8%; neut. equiv., 237.3. Found: Si, 11.4%; S, 13.1%; C, 40.4%; H, 4.3%; neut. equiv., 241.

When a similar hydrolysis was conducted using distilled beta(chlorosulfonylphenyl)ethyltrichlorosilane as the starting material, no purification step to remove sulfuric acid was required since no sulfuric acid was present.

Example 8

Analytically pure beta-(sulfophenyl)ethylpolysiloxane (34.2 g., 0.14 mole) was dissolved in 200 ml. of distilled water. To the resulting solution was added 232.8 g. of Alcoa activated alumina pellets (Grade F–10, 8–14 mesh). The pellets were allowed to soak for 2 hours, the liquid was drained off, and the impregnated pellets were dried, under reduced pressure, at 80–90° C. for 12 hours.

A vertical glass column (1.8 cm. diameter x 60.0 cm. long) was packed with the above beta-(sulfophenyl)ethylpolysiloxane on alumina catalyst. The top of the column was fitted with a distillation head connected to a cold trap immersed in a Dry Ice-acetone bath. The bottom was connected to a round-bottomed flask having a gas-inlet tube. Nitrogen gas was used as a carrier and diluent for the hydrocarbon. The catalyst bed was heated to 104–105° C. by an electrical jacket and isobutylene (preheated to 75° C.) was passed through the system at 70–80 ml. per min. for 1 hour. No isobutylene was collected in the cold trap. The lower round-bottomed flask contained a mixture of high boiling polymers, the weight of which corresponded to the weight of isobutylene used. The conversion of isobutylene to polymer was 100 percent.

*Example 9*

Glass microscope slides and a glass mirror were treated with a 1 percent water solution of the sodium salt of beta-(sulfophenyl)ethylpolysiloxane $[NaSO_3C_6H_4SiO_{3/2}]_x$ by dipping or wiping this solution on the glass surface. After drying the treated surface shows no fogging when breathed on or otherwise exposed to sudden contact with warm humid air.

What is claimed is:

1. As a new composition of matter an organosilicon compound selected from the class consisting of (1) chlorosulfonylaralkylsilane of the formula

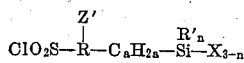

wherein R is a trivalent aryl group containing up to and including 10 carbon atoms, R' is an alkyl group, Z' is a member of the class consisting of hydrogen, alkyl groups, aryl groups and groups of the formula

and

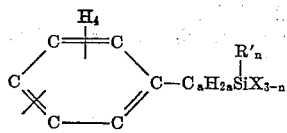

interconnected to R through carbon to carbon linkage, X is a halogen, $a$ is an integer of from 1 through 4, and $n$ is an integer of from 0 to 1, and (2) chlorosulfonylaralkylsiloxanes of the formula

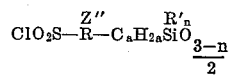

wherein Z" is a member of the class consisting of hydrogen, alkyl, aryl and groups of the formula

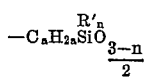

and

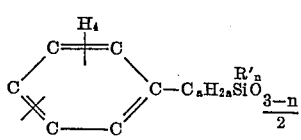

interconnected to R through carbon to carbon linkage, R, R', $a$ and $n$ having the above defined meanings and (3) chlorosulfonylaralkylsiloxanes consisting of at least one unit as defined in (2) and at least one unit of the formula

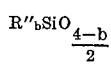

wherein R" is a monovalent hydrocarbon radical and $b$ is an integer of from 0 through 3.

2. As a new composition of matter a chlorosulfonylaralkylsilane of the formula

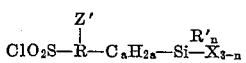

wherein R is a trivalent aryl group containing up to and including 10 carbon atoms, R' is an alkyl group, Z' is a member of the class consisting of hydrogen, alkyl groups, aryl groups and groups of the formula

and

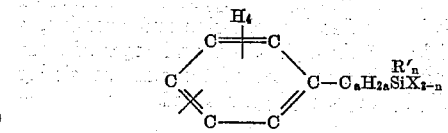

interconnected to R through carbon to carbon linkage, X is a halogen, $a$ is an integer of from 1 through 4, and $n$ is an integer of from 0 to 1.

3. As a new composition of matter a chlorosulfonylaralkylsiloxane of the formula

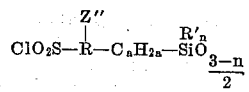

wherein R is a trivalent group containing up to and including 10 carbon atoms, Z" is a member of the class consisting of hydrogen, alkyl groups, aryl groups and groups of the formula

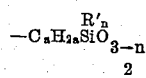

and

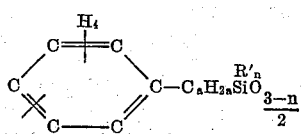

interconnected to R through carbon to carbon linkage, R' is an alkyl group, $a$ is an integer of from 1 through 4, and $n$ is an integer of from 0 to 1.

4. As a new composition of matter an organosilicon compound containing at least one chlorosulfonylaralkylsiloxane unit of the formula

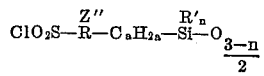

wherein R is a trivalent aryl group containing up to and including 10 carbon atoms, Z" is a member of the class consisting of hydrogen, alkyl groups, aryl groups and groups of the formula

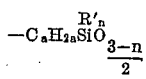

and

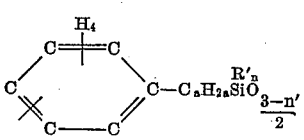

interconnected to R through carbon to carbon linkage, R' is an alkyl group, $a$ is an integer of from 1 through 4, and $n$ is an integer of from 0 to 1, and at least one unit of the formula

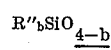

wherein R" is a monovalent hydrocarbon radical and $b$ is an integer of from 0 through 3.

5. Beta(chlorosulfonylphenyl)ethyltrichlorosilane.

6. Beta (chlorosulfonylphenyl) ethylmethyldichlorosilane.

7. Beta (chlorosulfonylphenyl)ethylmethyldifluorosilane.

8. Beta(chlorosulfonylphenyl)ethylpolysiloxane.

9. Beta (chlorosulfonylphenyl) ethylmethylpolysiloxane.

10. A process for producing a chlorosulfonylaralkylhalosilane of the formula

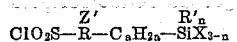

wherein R is an aryl group containing up to and including 10 carbon atoms, R' is an alkyl group, X is a member of the class consisting of fluorine, chlorine and bromine, $a$ is an integer of from 1 through 4, $n$ is an integer of from 0 through 1 and Z' is a member of the class consisting of hydrogen, alkyl groups, aryl groups and groups of the formula

and

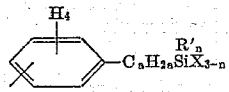

where R', X, $a$ and $n$ have the above defined meanings, which comprise reacting chlorosulfonic acid with an aralyklhalosilane of the formula

wherein R', Z', $a$ and $n$ have the above defined meanings and A is an aryl group containing up to and including 10 carbon atoms, in the presence of a solvent by adding said aralkylhalosilane to said chlorosulfonic acid.

11. A process for producing a chlorosulfonylaralkylhalosilane of the formula

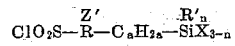

wherein R is an aryl group containing up to and including 10 carbon atoms, R' is an alkyl group, X is a member of the class consisting of fluorine, chlorine and bromine, $a$ is an integer of from 1 through 4, $n$ is an integer of from 0 through 1 and Z' is a member of the class consisting of hydrogen, alkyl groups, aryl groups and groups of the formula

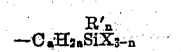

and

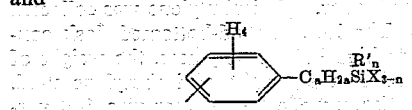

wherein R', X, $a$ and $n$ have the above defined meanings which comprise forming a mixture of chlorosulfonic acid and a solvent and adding to said mixture an aralkylhalosilane of the formula

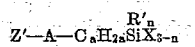

wherein R', Z', $a$ and $n$ have the above defined meanings and A is an aryl group containing up to and including 10 carbon atoms, while maintaining the reaction mixture at a temperature at which said chlorosulfonic acid and said aralkylhalosilane react to product said chlorosulfonylaralkylhalosilane.

12. A process as claimed in claim 11 wherein the temperature is from −25° C. to +20° C.

13. A process as claimed in claim 11 wherein the aralkylhalosilane is beta-phenylethyltrichlorosilane.

References Cited in the file of this patent

UNITED STATES PATENTS 2,789,121   Cooper _____ Apr. 16, 1957

OTHER REFERENCES

Kipping et al.: "Jour. Chem. Soc." (London), vol. 93 (1908), pages 2004–16.

Bygden: "Jour. Praktische Chemie," vol. 96 (1917), pages 86–104.

UNITED STATES PATENT OFFICE
CERTIFICATE OF CORRECTION

Patent No. 2,955,128              October 4, 1960

Donald L. Bailey

It is hereby certified that error appears in the above numbered patent requiring correction and that the said Letters Patent should read as corrected below.

Column 2, line 14, for "means" read -- meaning --; line 48, for "$ClO_2C$-" read -- $ClO_2S$- --; line 62, for "includes" read -- include --; column 5, line 35, for "chlora" read -- chloro --; column 7, line 32, for "(0.06 mm.)" read -- (0.6 mm.) --; line 71, for "$C_4H_6$" read -- $C_6H_4$ --; column 9, line 14, for "[$NaSO_3C_6H_4SiO_{3/2}$]$_x$" read -- [$NaSO_3C_6H_4C_2H_4SiO_{3/2}$]$_x$ --; column 10, line 25, for "$3\frac{-n}{2}$" read -- $\frac{3-n}{2}$ --.

Signed and sealed this 8th day of May 1962.

(SEAL)
Attest:

ERNEST W. SWIDER
Attesting Officer

DAVID L. LADD
Commissioner of Patents